US010655291B2

(12) United States Patent
Yang et al.

(10) Patent No.: US 10,655,291 B2
(45) Date of Patent: May 19, 2020

(54) REAL-TIME MONITORING SYSTEM FOR FLOAT-OVER INSTALLATION

(71) Applicant: SHANGHAI JIAO TONG UNIVERSITY, Shanghai (CN)

(72) Inventors: Jianmin Yang, Shanghai (CN); Xin Li, Shanghai (CN); Xinliang Tian, Shanghai (CN); Xiaoxian Guo, Shanghai (CN); Tao Peng, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 170 days.

(21) Appl. No.: 15/528,066

(22) PCT Filed: Sep. 16, 2015

(86) PCT No.: PCT/CN2015/089769
§ 371 (c)(1),
(2) Date: May 18, 2017

(87) PCT Pub. No.: WO2016/078470
PCT Pub. Date: May 26, 2016

(65) Prior Publication Data
US 2019/0085523 A1 Mar. 21, 2019

(30) Foreign Application Priority Data

Nov. 19, 2014 (CN) .......................... 2014 1 0663636

(51) Int. Cl.
*E02B 17/02* (2006.01)
*G01B 11/14* (2006.01)
(Continued)

(52) U.S. Cl.
CPC ........ *E02B 17/0017* (2013.01); *E02B 17/024* (2013.01); *G01B 11/14* (2013.01);
(Continued)

(58) Field of Classification Search
CPC ..... E02B 17/0017; E02B 17/024; E02B 17/02
See application file for complete search history.

(56) References Cited

U.S. PATENT DOCUMENTS

2008/0135233 A1* 6/2008 Horton .................. B63B 35/003
166/244.1

FOREIGN PATENT DOCUMENTS

| CN | 102001419 A | 4/2011 |
| CN | 103196374 A | 7/2013 |

(Continued)

OTHER PUBLICATIONS

Translation CN 103196374; All (Year: 2013).*
(Continued)

*Primary Examiner* — Benjamin F Fiorello
(74) *Attorney, Agent, or Firm* — Blank Rome LLP

(57) ABSTRACT

A real-time monitoring system for float-over installation in ocean engineering, which relates to real-time monitoring for the relative position between the leg mating unit and the stabbing cone of upper module, mainly includes: a shooting collection system and a real-time processing and displaying system, the shooting collection system mainly including a CCD camera and a high light-reflecting landmark, the high-precision CCD camera being a graphic information collecting device, and the high light-reflecting landmark being a mark made of high light-reflecting and light-absorbing materials; a real-time processing and collecting system, which receives and displays in real time, analyzes and stores the graphic information, capable of calculating the coordinates of relative position between the stabbing cone and the leg mating unit in real time. The system achieves real-time close-range photogrammetry for the position of the leg mating unit, characterized by clear positioning, explicit functions, being easy to realize the structures, thus solving the difficult problem that the relative position between the (Continued)

leg mating unit (LMU) and the stabbing cone of the module is difficult to be measured accurately in real time during the float-over installation.

2 Claims, 2 Drawing Sheets

(51) Int. Cl.
*E02B 17/00* (2006.01)
*G06T 7/80* (2017.01)
*G06T 7/20* (2017.01)
*H04N 5/232* (2006.01)

(52) U.S. Cl.
CPC .................. *G06T 7/20* (2013.01); *G06T 7/80* (2017.01); *H04N 5/23206* (2013.01)

(56) References Cited

FOREIGN PATENT DOCUMENTS

| CN | 103308028 A | | 9/2013 |
| CN | 103617333 A | * | 3/2014 |
| CN | 104390588 A | | 3/2015 |
| JP | 2005195563 A | | 7/2005 |
| KR | 100730694 B1 | | 6/2007 |

OTHER PUBLICATIONS

Translation; Review on the technology development of floatover; ALI (Year: 2012).*
X. Xu, et al., "Review on the Technology Development of Floatover", China Offshore Platform, vol. 27, No. 1, Feb. 2012, pp. 44-53; w/English-language Abstract.

* cited by examiner

REAL-TIME MONITORING SYSTEM FOR FLOAT-OVER INSTALLATION

RELATED APPLICATIONS

This application is a national phase of PCT/CN2015/089769, filed on Sep. 16, 2015, which claims the benefit of Chinese Patent No. 201410663636.4, filed on Nov. 19, 2014. The content of these applications are hereby incorporated by reference.

FIELD OF THE INVENTION

The present invention relates to the technical field of ship and ocean engineering, and in particular to a real-time monitoring system for float-over installation of an ocean platform.

DESCRIPTION OF THE PRIOR ART

Float-over installation is an emerging method for installation of large modules at sea, which has the characteristics of low cost, short operating time, large lifting capacity, wide application scope, convenient and safe operation and so on. The process of float-over installation at sea involves the relative movements between the upper module, the barge and the jacket, including a series of complex processes such as ship entering, position adjustment, load transfer, continued loading and ship leaving.

The core of float-over installation is the mating process of the upper module and the leg mating unit (LMU). In order to ensure the smooth progress of float-over installation and ensure the safety of the installation process, it is necessary to monitor the movements of the upper module and the leg mating unit (LMU) in real time to provide position data of the real-time relative movements and monitoring pictures for the on-site installation commanders. In addition, the actual measurement at sea, as an important research means in the field of ship and ocean engineering, can truly reflect the force and motion response of the ship and the ocean structure in practical situations. Compared with model test and numerical simulation, the actual measurement at sea has incomparable advantages in the authenticity and reliability of data, and thus it is widely used in the verification of the results of numerical simulation and model test. Therefore, the actual measurement at sea has very important significance to the on-site installation and the scientific research.

The existing image monitoring systems cannot meet the special requirements of the actual measurement at sea described above, can only provide real-time pictures of the on-site installation, cannot calculate the high-precision relative position coordinates in real time, and cannot provide technical support for the on-site installation decision makers. Meanwhile, as the work site is located on the ocean structure away from the land, the equipment installation and connection is relatively inconvenient, the environmental conditions are very bad, and the measurement requirements are high. This puts forward new requirements for the image monitoring system, which require the ability to adapt to the harsh ocean environment and to continue to work safely and reliably.

Accordingly, those skilled in the art are working to develop a real-time monitoring system for float-over installation to solve the problem that the relative position of the leg mating unit (LMU) is difficult to be measured accurately in real time during the float-over installation.

SUMMARY OF THE INVENTION

In view of the drawbacks of the prior art, the technical problem to be solved by the present invention is that the relative position of the leg mating unit (LMU) is difficult to be measured accurately in real time during the float-over installation. The function of the system according to the present invention is to capture the movement of the leg mating unit (LMU) during the float-over installation, to provide accurate real-time movement data, and to provide technical support for the on-site commanders. In order to realize this function, the system according to the present invention collects graphic information via a high-definition CCD camera, transmits data via a Gigabit network cable, and processes the graphic information with a real-time processing software in real time to calculate the coordinate information of the relative movement of the leg mating unit (LMU) in real time.

To achieve the above-described object, the present invention provides a real-time monitoring system for float-over installation, including: a shooting collection system and a real-time processing and displaying system; the shooting collection system includes a CCD camera and a high light-reflecting landmark, the CCD camera is connected to a processing computer by means of a Gigabit network to transmit the collected graphic information to the real-time processing and displaying system; and the real-time processing and displaying system includes the processing computer and a real-time processing software, the processing computer and the real-time processing software display, analyze and store the graphic signals in real time, and calculate the relative position between the leg mating unit and the stabbing cone in real time.

Further, the CCD camera is a high-precision fixed-focus camera, placed at a position opposite to the leg, and transmits data and realizes the remote control via the Gigabit network.

Further, the high light-reflecting landmark is circular and is made of a light-absorbing cloth and a diamond grade light-reflecting material, the circular landmark ensuring accurate capture of the position of the leg mating unit in various harsh conditions.

Further, the real-time processing software calculates the relative position between the leg mating unit and the stabbing cone with a determined proportional relationship for the shot photograph by the method of close-range photogrammetry, and can display the on-site practical situation in real time; the real-time processing software possesses the following functions: camera parameter verification, image calibration, camera control, real-time displaying and recording of collected images, real-time displaying and recording of 2D movement and relative distance of components.

The real-time monitoring system for float-over installation according to the present invention is characterized by clear positioning, explicit functions, easy to realize the structures, and solves the problem that the relative position of the leg mating unit (LMU) is difficult to be measured accurately in real time during the float-over installation.

The concepts, the specific structures and the technical effects of the present invention will be described further below in conjunction with the accompanying drawings, in order to fully understand the objects, features and effects of the present invention.

DETAILED DESCRIPTION OF THE PREFERRED EMBODIMENTS

Figure 1:
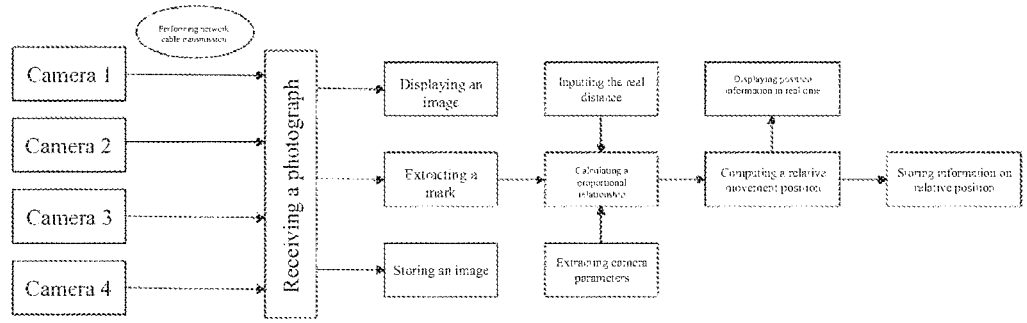
FIG. 1 is a schematic flow diagram of the working principle of a real-time monitoring system according to a preferred embodiment of the present invention.

The embodiment of the present invention is described in detail below with reference to the accompanying drawings, the present embodiment is carried out on the basis of the technical solution according to the present invention, and detailed implementations and specific operations are given, but the scope of protection of the present invention is not limited to the given embodiment.

The present invention provides a real-time monitoring system for float-over installation, which is a measurement system for monitoring the relative position between the leg mating unit (LMU) and the stabbing cone during the float-over installation in ocean engineering in real time. The present invention is achieved by the following technical solution which mainly includes: a shooting collection system and a real-time processing and displaying system; the shooting collection system mainly includes a CCD camera and a high light-reflecting landmark, the CCD camera being a graphic information collecting device, connected to a monitoring computer by means of a Gigabit network cable for transmitting the collected graphic information to the monitoring computer; the high light-reflecting landmark is a special mark which is made of a high light-reflecting and light-absorbing material for ensuring the capture of the position of the leg mating unit (LMU) in various harsh conditions. A real-time processing and collecting system receives and displays in real time, analyzes and stores the graphic information, and can calculate the coordinates of relative position between the stabbing cone and the leg mating unit (LMU) in real time.

The camera is a CCD high-precision camera placed at a specific position, which is characterized by fixed focus, high definition, fast shooting speed, high number of collected frames, and data transmission via a network cable and achieving remote control. Meanwhile, it is characterized by waterproof and lightning protection, and accords with the standards to use at sea.

The high light-reflecting landmark is made of a light-absorbing cloth and a diamond grade light-reflecting material. The high light-reflecting landmark with a special shape ensures the accurate capture of position of the leg mating unit (LMU) in various harsh ocean conditions.

The analyzing and processing software can calculate the coordinate information of the relative movement of the leg mating unit (LMU) in real time based on the collected graphic information. The software possesses the following functions: camera parameter verification, image calibration, camera control, real-time displaying and recording of collected images, real-time displaying and recording of 2D movement (in horizontal and vertical directions) and relative distance of components. The function of camera parameter verification refers to the software capable of collecting and recording the internal azimuth parameter of the CCD camera used for shooting to eliminate the error brought by taking photographs. The function of image calibration refers to the software capable of specifying the real distance between two points on an image automatically or manually and thus determining the proportional relationship between the pixel distance and the real distance. The function of camera control refers to the software capable of remotely controlling the starting and ending of the camera, and remotely adjusting the parameters of the camera, such as the number of collected frame, the shutter speed and so on. The function of real-time displaying and recording of collected images refers to the images being displayed in the main interface of the software in real time and all of the collected images being recorded in a disk. The function of real-time displaying and recording of relative distance refers to the software capable of calculating the relative distance between two moving objects on an image in real time based on the verification and calibration parameters of the camera and the results being displayed in real time on the main interface of the software and being recorded in the disk.

As shown in FIG. 1, the main process of the present invention is to obtain high-definition image information with a CCD camera, and to obtain the information on the relative position between the upper module and the leg mating unit (LMU) in real time by analyzing and processing the obtained image information to provide technical support for the float-over installation.

Figure 2:
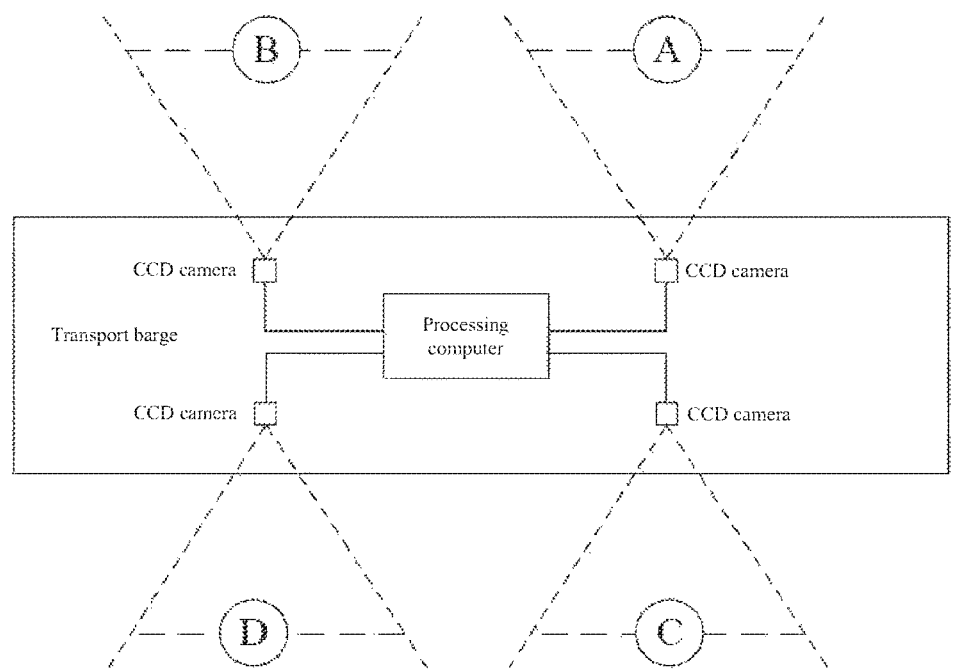
FIG. 2 is a schematic distribution diagram of CCD cameras of a real-time monitoring system according to a preferred embodiment of the present invention.

As shown in FIG. 2, in the position opposite to each of the legs on the transport barge, such as A, B, C, D, a CCD high-precision camera is mounted, and the cameras are powered by the power supply system on the transport barge, and each of the CCD cameras is connected to the central processing computer via a Gigabit network cable to form a local area network. The real-time processing software is opened for remotely controlling the CCD cameras to take photographs for test, ensuring that each of the cameras captures the landmark on the leg mating unit (LMU). During the float-over installation, with the real-time processing software, the CCD cameras are controlled to take photographs, and the coordinates of relative movement of the leg mating unit (LMU) is calculated in real time.

Figure 3:
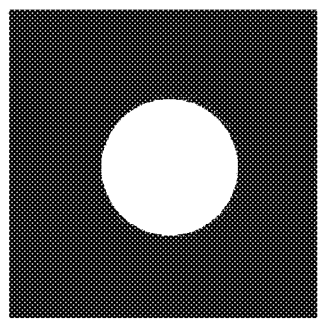
FIG. 3 is a simplified diagram of a high light-reflecting landmark according to the present invention.

The high light-reflecting landmark shown in FIG. 3 is fixed together with the leg mating unit (LMU), and the distance from the center of the light-reflecting landmark to the uppermost end of the leg mating unit (LMU) is measured.

The preferred specific embodiments of the present invention have been described in detail above. It is to be understood that numerous modifications and variations can be made by those ordinary skilled in the art in accordance with the concepts of the present invention without any inventive effort. Hence, the technical solutions that can be derived by those skilled in the art according to the concepts of the present invention on the basis of the prior art through logical analysis, reasoning and limited experiments should be within the scope of protection defined by the claims.

The invention claimed is:

1. A real-time monitoring system for float-over installation, comprising: a shooting collection system and a real-time processing and displaying system; the shooting collection system comprises a CCD camera and a high light-reflecting landmark, the CCD camera is connected to a processing computer by means of a Gigabit network for transmitting collected graphic information to the real-time processing and displaying system; the real-time processing and displaying system comprises the processing computer and a real-time processing software, the processing computer and the real-time processing software display, analyze and store graphic signals in real time, and calculate the relative position between a leg mating unit and a stabbing cone in real time;

wherein the CCD camera is a high-precision fixed-focus camera, placed at a position opposite to the leg, and transmits data and realizes remote control via the Gigabit network;

wherein the high light-reflecting landmark is made of a light-absorbing cloth and a diamond grade light-reflecting material; a distance from a center of the light-reflecting landmark to an uppermost end of the leg mating unit is measured: the processing computer and the real-time processing software can display and record the horizontal and vertical relative distances of components in real time;

wherein the real-time processing software calculates the relative position between the leg mating unit and the stabbing cone with a determined proportional relationship for a shot photograph by method of close-range photogrammetry, and can display the on-site practical situation in real time; the real-time processing software possesses the following functions: camera parameter verification, image calibration, camera control, real-time displaying and recording of collected images, real-time displaying and recording of 2D movement and relative distance of the components.

2. The real-time monitoring system for float-over installation according to claim 1, wherein the high light-reflecting landmark is circular, the circular landmark ensuring accurate capture of the position of the leg mating unit in various ocean conditions.

* * * * *